United States Patent [19]
Craft et al.

[11] Patent Number: 6,009,540
[45] Date of Patent: Dec. 28, 1999

[54] LOGIC MODULE FOR IMPLEMENTING SYSTEM CHANGES ON PC ARCHITECTURE COMPUTERS

[75] Inventors: Thomas W. Craft, Laguna Hills; Donald Lee Dobbs, Mission Viejo, both of Calif.

[73] Assignee: AITM Associates Incorporated, San Diego, Calif.

[21] Appl. No.: 08/838,523

[22] Filed: Apr. 8, 1997

[51] Int. Cl.⁶ .............................. G06F 11/00; G06F 1/14
[52] U.S. Cl. .............................. 714/30; 714/54; 714/55; 714/731; 713/400; 713/500; 713/503
[58] Field of Search ................... 395/183.06, 183.07, 395/183.11, 183.18, 555, 556, 557, 558, 559, 560, 185.07, 185.08, 182.03; 371/21.1, 22.1, 27.7; 714/30, 31, 35, 20, 54, 55, 731, 724; 713/400, 500, 600, 503

[56] References Cited

U.S. PATENT DOCUMENTS

| | | | |
|---|---|---|---|
| 4,868,800 | 9/1989 | Arber | 368/29 |
| 5,422,862 | 6/1995 | Wisor | 368/10 |
| 5,572,718 | 11/1996 | Scriber et al. | 395/555 |
| 5,600,802 | 2/1997 | Yazdy et al. | 395/282 |
| 5,600,836 | 2/1997 | Alter | 395/612 |
| 5,603,007 | 2/1997 | Yazdy et la. | 395/467 |
| 5,630,118 | 5/1997 | Shaughnessy | 395/601 |
| 5,687,325 | 11/1997 | Chang | 395/284 |
| 5,740,442 | 4/1998 | Cox et al. | 395/704 |
| 5,808,889 | 9/1998 | Burgess | 364/737 |
| 5,809,500 | 9/1998 | Nolan | 707/6 |

OTHER PUBLICATIONS

*Computer Link* Supplement to San Diego Union Tribune of Mar. 11, 1997, pp. 18–21. General background and problem to be solved.

Millennium Bios Board; Internet; htp://www.implement-.co.uk/bios.htm. Advertisement for a circuit board year 2000 solution made by a United Kingdom company. Applicant was unable to determine from the literature the approach used, or whether it incorporates technology contained in the application.

*The Year 2000 Computing Crisis*; Murray, Jerome T.; Murray, Marilyn J; Introduction; pp. xii–xviii. Background material of millennium problem used in preparation of background of specification.

*Primary Examiner*—Dieu-Minh T. Le
*Attorney, Agent, or Firm*—Brown, Martin, Haller & McClain

[57] ABSTRACT

A system, method and apparatus including a logic module, preferably embodied as an electronic card that operates in combination with a PC to correct errors caused by deficiencies existing in logic residing on the PC's motherboard, such as the PC's BIOS. The preferred logic card includes a transceiver module, a memory module (e.g. an EPROM or Masked ROM) containing storage elements and executable code stored as pages. The preferred logic card also includes a page register module in communication with the transceiver and the memory, and a paging mechanism that cooperates with the page register and the transceiver for allowing only a predetermined number of bytes (pages) of executable code to be accessible for operation in the PC's main-memory in order to correct errors caused by deficiencies existing in logic residing on the PC's motherboard.

9 Claims, 10 Drawing Sheets

LOGIC MODULE FOR IMPLEMENTING SYSTEM CHANGES ON PC ARCHITECTURE COMPUTERS

BACKGROUND OF THE INVENTION

1. Field of the Invention

The present invention relates generally to IBM-type Personal Computers (PC), and more specifically to a logic module, preferably implemented as firmware, for implementing system changes on PC architecture computers.

2. Description of the Related Art

In 1981, IBM introduced a personal computer, aptly named the IBM Personal Computer or PC. The original IBM PC was built of many off-the-shelf non-proprietary components and was based on an "open" computer architecture. The architecture is described as "open" because IBM published its specifications to encourage other vendors to create software and add-in cards to foster the PC's market popularity. Many manufacturers began marketing personal computers with the open architecture and this became known as IBM PC-clones. Eventually, the combination of the IBM PC itself and the clones became known as simply PCs to distinguish them from Apple Computer Architecture which followed a completely different standard.

PCs made by many manufacturers have enjoyed considerable market success. From the PCs inception until about 1995 approximately 250–300 million IBM PC and PC-clones were manufactured worldwide. Some experts in the field estimate approximately 120–180 million of these PCs and clones are still in service. These pre-1995 (estimated date) PCs share a common problem due to deficiencies in low-level hardware and the PC's operating system. The most common shortcoming is that the program code running on a specialized "Basic Input Output System (BIOS)" chip within the PC that controls the computer's most basic operations fails to enable the system to maintain the correct date following 11:59:59 p.m. Dec. 31, 1999.

The invention described in this specification directly addresses this problem by providing a system and method for fixing system deficiencies, in low-level hardware or with components of the operating system that could also work to specifically address the date and time problem described above.

SUMMARY OF THE INVENTION

To overcome the problems described above and those which will become apparent upon reading the detailed description below, a new logic module includes logic for operating in combination with a PC for correcting errors caused by deficiencies existing in logic residing on the PC's motherboard. The logic module is preferably implemented as an electronic card on an expansion slot that is coupled to the PC's motherboard.

The logic module in a preferred embodiment includes a transceiver module, a memory module containing storage elements and executable code stored as pages in the module. Each page represents a predetermined number of bytes (a byte is an 8-bit value of code in the storage elements. The logic module further includes a page register module in communication with the transceiver and the memory, and paging mechanism that cooperates with the page register and the transceiver for allowing only a predetermined number of bytes of executable code to be accessible for operation in the PC's main-memory address space in order to correct errors caused by deficiencies existing in logic residing on the PC's motherboard.

The logic module contains a mechanism, that is a page register operating in conjunction with the a PC I/O port, so that a different page of executable code may be accessed from the memory module as a result of executing a specific software I/O command.

The logic module is particularly useful for fixing date and time errors caused by BIOS deficiencies. And in especially the invention is particularly useful for resolving problems leading to date and time problems, as described above. In such a case the logic module also includes a clock module in communication with the transceiver module and the memory module, wherein the clock module includes a memory-store. In this alternative embodiment, the executable code in the memory module further includes (1) a clock-reading mechanism responsive to information contained within the clock module's memory store by placing a century designating value within the clock's store, (2) an interrupt-trap setting mechanism capable of seizing control from the PC's BIOS in response to a predetermined interrupt for which an interrupt-trap is set by the interrupt-trap setting mechanism, and (3) a clock-setting mechanism responsive to date and time information read by the clock-reading mechanism for setting the real-time clock on the motherboard that is incorrect due to deficiencies in the BIOS.

Another optional advantage of the logic module includes computer-executable code for configuring the logic module to operate in combination with the PC following coupling of the logic module in electrical communication with the PC's motherboard. This computer-executable code is preferably embodied on a computer-readable recording medium, such as a well-known floppy disk.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings in which identical numbers in various views represent the same or similar elements, and wherein.

DESCRIPTION OF PREFERRED EMBODIMENTS

The present invention builds upon the basic computer architecture of the PC, which in the context of this specification refers to a computer having an architecture based on the original IBM PC, including IBM-compatible or IBM-clone PCs. Therefore it useful to explain some of elements of the basic PC architecture and their operational relationships, prior to introducing the operation of the present invention.

Basic PC Architecture

Figure 1:
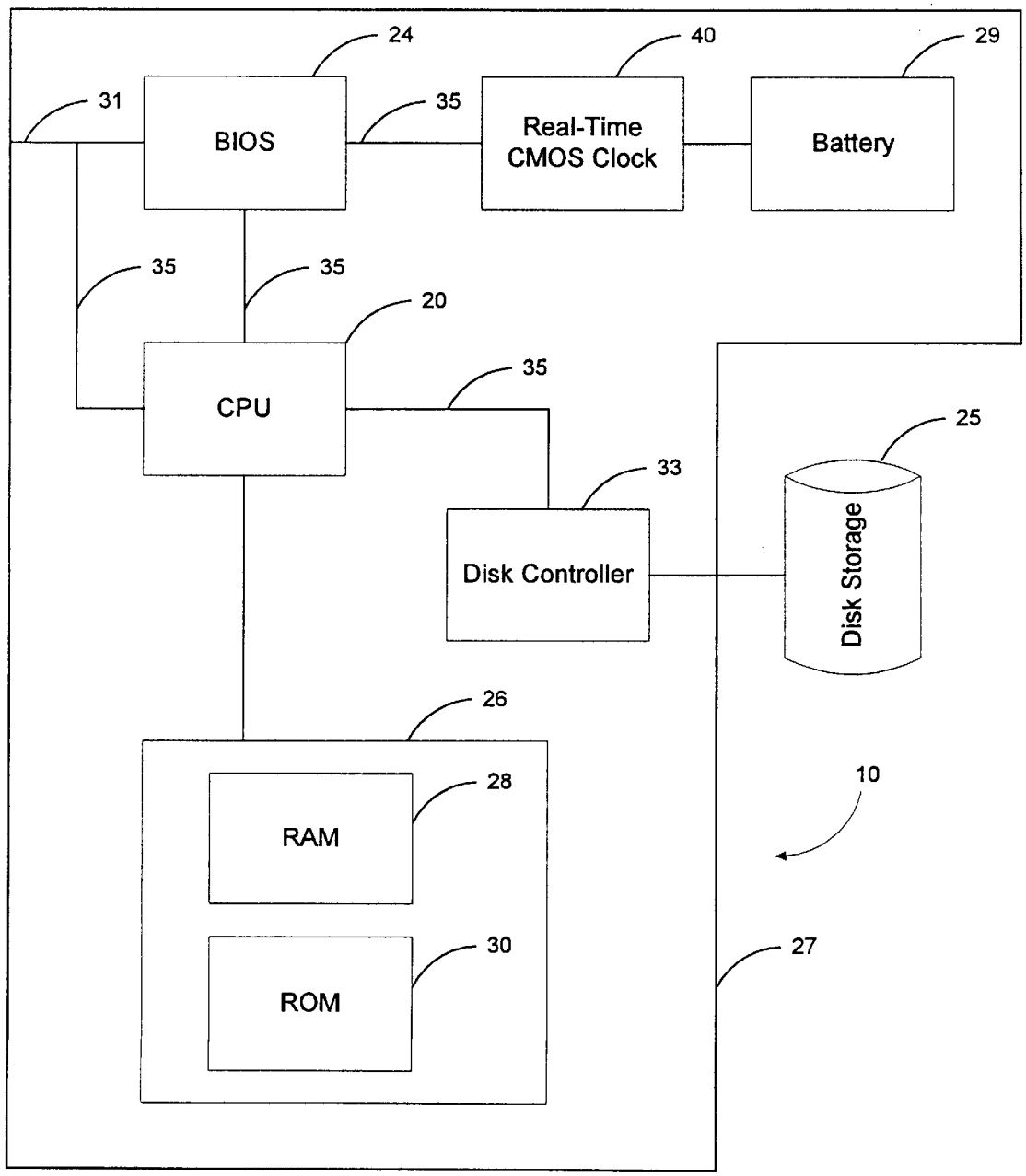
FIG. 1 is a simplified overview of a prior art architecture of a PC.
Figure 2:
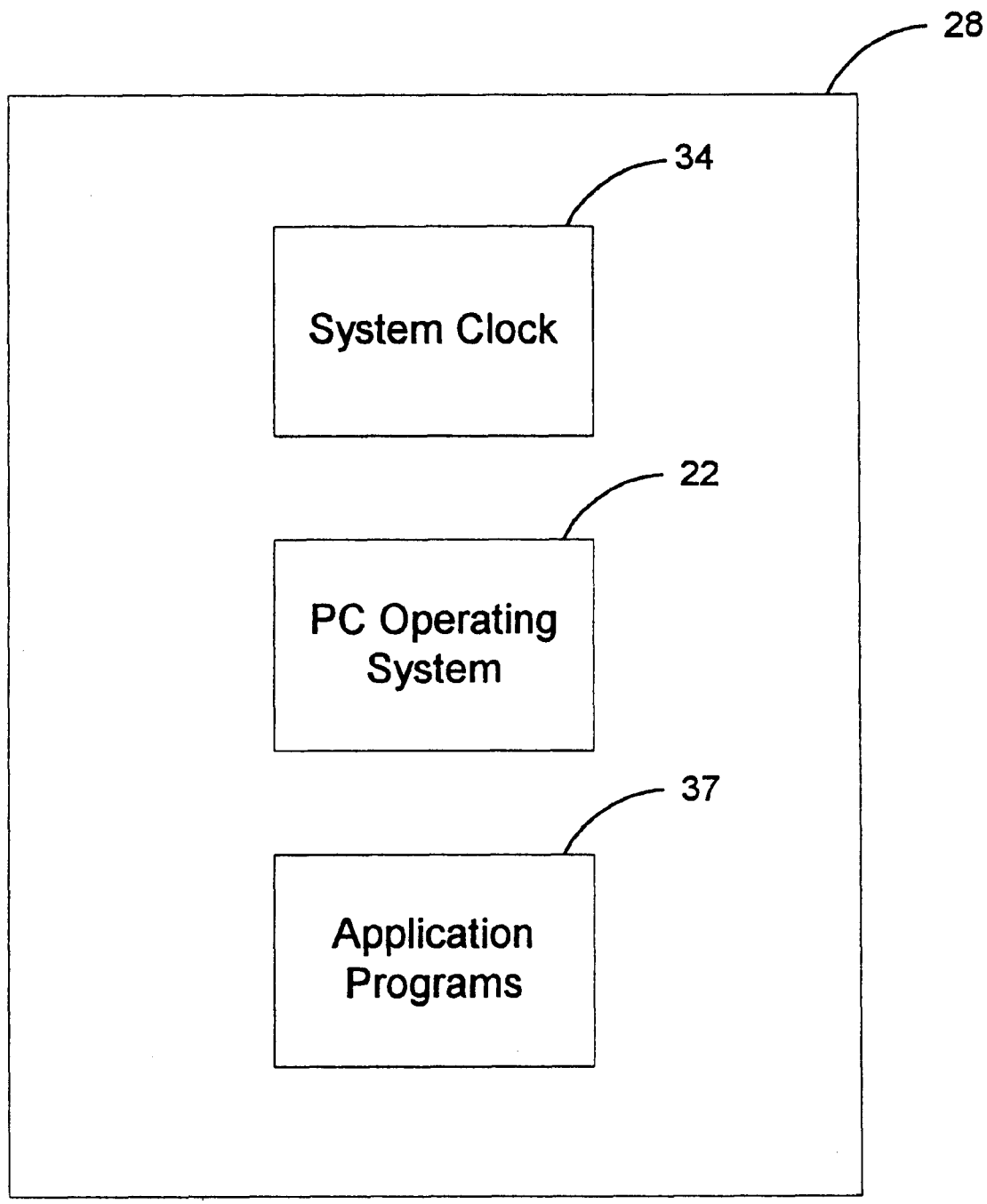
FIG. 2 is a simplified overview of the relationship of this system clock, operating system and application programs in the prior art PC of FIG. 1.

FIG. 1 shows a simplified overview of the basic architecture of the PC 10 (i.e., according to the definition above, and for those PCs manufactured before about 1995). FIG. 2 shows certain components of logical code that operate in the main memory of PC 10, and which are described below. In this prior art PC, the central processing unit or CPU 20 is typically manufactured by Intel or built according to their specifications. The CPU is the "brains" or "engine" of the computer responsible for overseeing all execution of operations in the computer. The operating system 22 of such a PC is typically DOS, which stands for Disk Operating System. The PC, includes a Basic Input Output System (BIOS) chip 24, main memory 26 including random access memory (RAM) 28 and read only memory (ROM) 30, disk memory 25, and the CPU to allow execution of software application programs 32. The operating system software code and application programs are stored on disk memory 25 and loaded into random access memory for execution. The hardware components communicate along data pathway or bus 35 which is included on a large planer card or motherboard 27 which houses the CPU 20, main memory 26, and other components including BIOS chip 24, disk controller 33, and real-time Complementary Metal Oxide Semiconductor (CMOS) clock 40 which are described below. The bus of the PC 10 that operates in combination with the present invention for compensating for deficient BIOS code is an Industry Standard Architecture (ISA) bus. Expansion slot 31 accepts industry standard cards. Standard specifications for such an ISA Bus are available from the American National Standards Institute (ANSI). Nevertheless, any PC bus may be made to operate in combination with the present invention in view of these teachings by one skilled in the art.

Many of application programs 37 include programs that rely on the operating system's software or system clock 34 for determining the time and date. Such software applications might for example include accounting and other financial programs that rely on accurate dates and date comparison techniques for determining such things as interest rate determination, benefits eligibility, asset depreciation, accounts receivable aging, and other similar aspects.

System clock 34 is updated by BIOS 24 when the PC is "booted" or reset for operation, by a power-on or other reset operation. The "boot" is the start-up process of a computer where it is said to electronically "pull itself up by its bootstraps." The bootstrap metaphor suggests the process wherein code is extracted and executed by low-level hardware and software in the PC, before turning over control to the PC's operating system. A computer may be "cold-booted" or "warm-booted." A cold-boot is a boot sequence initiated when power is applied or by pressing the hardware reset button if power is already on. A warm-boot is a boot sequence initiated by typing CTRL/ALT/DEL in which no hardware resetting occurs and the BIOS routines skip memory testing. However, most other functions that occur during a cold-boot are performed.

During the initial boot sequence, a real-time clock circuit 40 that is a Complementary Metal Oxide Semiconductor (CMOS) integrated circuit chip coupled to a backup battery 29, the BIOS performs date routines that access registers in the clock circuit 40. Information in these registers is passed along by BIOS to the system clock 34 for updating.

The system clock is then updated with a rate of about 18 Hz responsive to a hardware timer interrupt. Certain software interrupts (hexadecimal 08 and 1A) provide the operating system 22 with access to the low-level hardware-specific BIOS code needed to manipulate the system clock and the real-time clock. The system clock 34 maintains a software counter of the number of interrupts since the most previous midnight and a count of the number of days since a baseline date, which in these earlier PCs is typically Jan. 1, 1980. In some BIOSs the baseline date is Jan. 4, 1980, and in others an even more recent date is used. Nevertheless, the present invention is generally useful for setting the system clock as described herein notwithstanding the particular baseline date.

The real-time clock 40 is referenced only during the boot sequence and only for the purpose of setting the system clock 34. During normal operation of the PC 10 the real-time clock is not referenced because the operating system 22 derives the current date and time from software counters in the system clock (software) 34. However, the real-time clock 40 may be accessed during normal operations if it is being set to new values, such as by the user-initiated DOS Date and Time commands. It is also possible for software applications, such as applications programs 37, to reference or alter the real-time clock directly (e.g. such as in diagnostic programs) but generally "well-behaved" programs normally utilize interrupt gateways within the BIOS chip 24 in order to maintain software compatibility across a variety of different hardware platforms.

BIOS Operation

The BIOS chip 24 includes a collection of low-level software routines and functions that communicate directly with the hardware of PC 10, e.g. the real-time clock 40 and the I/O peripherals. These routines and functions are typically called "firmware" and originally were stored in read only memory (ROM). As newer technologies from the integrated circuit chip manufacturers emerged, such BIOS chip firmware (i.e., code stored in hardware, such as ROM, or an EPROM, but not including a disk drive) was created with well-known "Masked ROMs" and eventually to the non-volatile "flash ROM" technology. Thus, the present invention is not limited to operation with a particular circuit technology for the BIOS.

The BIOS also includes code that performs a limited diagnostic of the computer during the power-on stage known as the "Power On Self Test (POST)." When power is applied to PC 10, firmware in the BIOS is executed by the CPU 20 before the operating system 22, e.g, MS-DOS, is activated. One of the functions performed by BIOS 24 includes setting up interrupt vector tables in lower addresses of RAM 28 to be used by operating system 22. The location and meaning of these vectors is standardized as part of the open architecture of the PC. BIOS provides a common interface standard across all models of PCs. So called "well-behaved software" never bypasses the interrupt gateways encoded in BIOS code to access the hardware directly. BIOS may be customized by each PC manufacturer, but it insulates well-behaved application software from any low-level hardware variations that occur from one model to the next, or from one manufacturer to the next.

Manufacturers of BIOS for PCs include IBM (exclusively for IBM-brand PCs), Phoenix Technologies, AMI, Award, and Microid for all other PCs. The PC manufacturer licenses BIOS from one of its manufacturers and then has the opportunity to customize various low-level routines to comply with the particular PC's specific hardware design or to add business logos and/or copyright notice which appear at boot time. Thus, there is no one standard version of a BIOS used in every PC. Therefore, it is impossible to produce a single BIOS replacement chip to affect the system clock and thus overcome the problems described above, with reference to the inability for PCs manufactured before about 1995 to enable the system clock to maintain the correct date following 11:59:59 p.m. Dec. 31, 1999.

A Problem Addressable by Present Invention

The inventors have critically recognized that the heart of the date problem described above is in large-part due to two aspects of the PC architecture, each of which is now described below.

A typically-utilized CMOS clock chip 40 in PC 10 (e.g., Motorola's chip MC146818A, Dallas Semiconductor's chip DS1287, or National's chip 5832) make no provision century for which the particular two-digit year belongs. Thus, for example, the current year is calculated as a two-digit value from 00 to 99. When year 99 expires, the chip rolls over to 00 again and starts recounting toward another 99-year value. Recognizing the inadequacy of such a system, the designers of PCs and BIOS chips eventually made a provision for using an unused byte in the real-time clock 40 to indicate whether the century was the 20th or 21st. For example, in some implementations a "0" meant the 20th Century and a "1" meant the 21st Century. In most cases either a "19" or a "20" is stored in the unused byte. The 19 or 20 is stored as either a binary number or a packed BCD number, thus two digits can in fact be stored in a single byte. Unfortunately, since the century-indicating information is a relatively static value, merely stored in an element of the real-time clock 40, rather than part of the electronic circuitry of the clock chip that generates time and date information it does not by itself cause any action to be taken to prevent a mere date roll-over from 99 to 00, as described above.

In such a situation when the PC 10 is booted following the date roll-over, BIOS 24 performs a routine that reads the date from the clock chip 40 and hence reads the static "19" and the dynamic "00." The BIOS code, originally developed in the 1980s, is programmed to consider this as an error condition indicating clock failure such as a totally discharged backup battery 29 (FIG. 1). Having no other means of determining the actual date, the code merely sets the real-time clock date back to the pre-programmed baseline date such as Jan. 1, 1980 or Jan. 4, 1980, as described above.

The inventors have also critically recognized that in such a situation, the system clock 34 (recall this clock, used by the operating system and its programs is entirely software) will rollover to 2000 if PC 10 is powered-on and is running, but the operating system does not update the CMOS-memory register in the clock chip 40. Nevertheless, the inventors have discovered that even if the correct date, including a correct century value is stored in the CMOS-memory register of the clock chip 40, empirical results show that an overwhelming majority of the BIOS firmware, manufactured prior to about 1995, interpreted such as an error and reverted the clock 40 date back to the baseline date, as described above.

While not limiting to the scope or spirit of the invention, the inventors have made the critical recognition of a fundamental problem with most BIOS code in the 140–180 million PCs manufactured prior to about 1995: There is no recognition for century information regardless of its value ("19" or "20"). Instead the BIOS code is programmed to treat any year (such as 79) prior to the decade of the introduction of the PC, i.e. 80, as a hardware failure, thus returning the real-time clock and in turn the system clock back to the date to the BIOS's baseline (usually Jan. 1, 1980).

Post-1995 BIOS code from most BIOS producers, or their licensees, corrects this deficiency by accepting the years between 00 and 79 at face value. The century is then rolled over from 19 to 20 if it is not already set to 20. In these instances correctly designed BIOS firmware successfully overcomes the lack of a century counter in the clock chip. In a few instances software routines in the form of terminate and stay resident (TSR) code can alleviate the problem, but in many pre-1995 BIOS chips the firmware executed during the boot process destroys potentially valid 21st Century dates before any corrective TSR code has a chance to overcome the problem. (A TSR program is a dormant program residing in RAM that can be activated at will from another program or by special combination of keystrokes.)

Overview of Cooperation of Present Invention with PC Architecture

Figure 3:
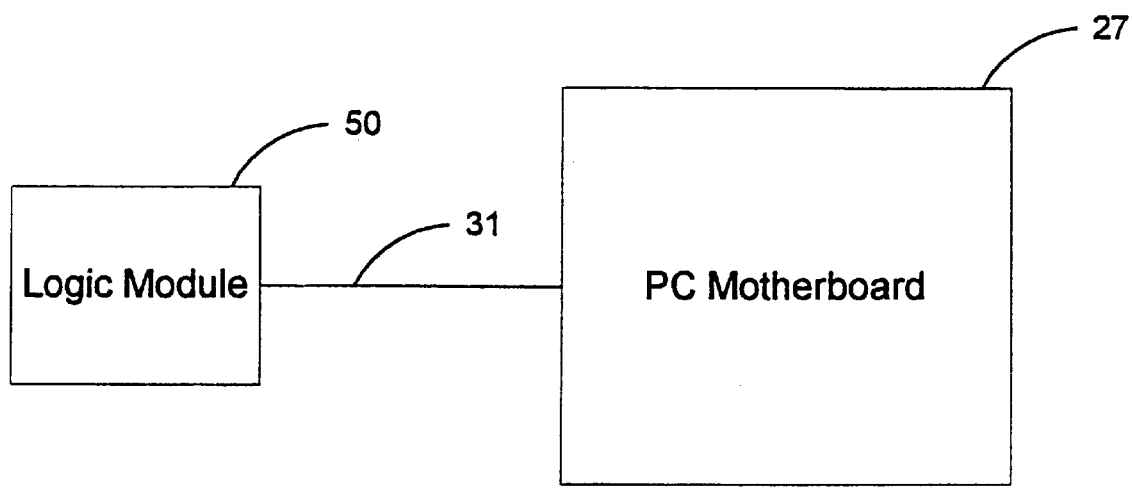
FIG. 3 is a simplified block diagram, showing an architectural relationship of the logic module of the present invention and the computer architecture shown in FIG. 1 and embodied on the PC motherboard of the PC of FIG. 1.

Referring to FIG. 3, a logic module 50 for performing the processes of the present invention, described below with reference to FIGS. 5 through 9, operates with the components and in particular the BIOS 24 and the clock chip 40 to correct the problems described above. In a preferred embodiment, the logic module 50 includes a plurality of electronic circuits and components packaged together on a single electronic card and is coupled with the PC 10 through expansion slot 31. However, it should be apparent to those skilled in the art that the logic module could be implemented as part of the PC motherboard 27.

FIG. 3 shows logic module 50 in more detail, and is the preferred embodiment of an electronic card. Nevertheless, one may implement the module directly on the motherboard 27 of PC 10 or as software without deviating from the spirit or scope of the invention.

Overview of Operation

Figure 4:
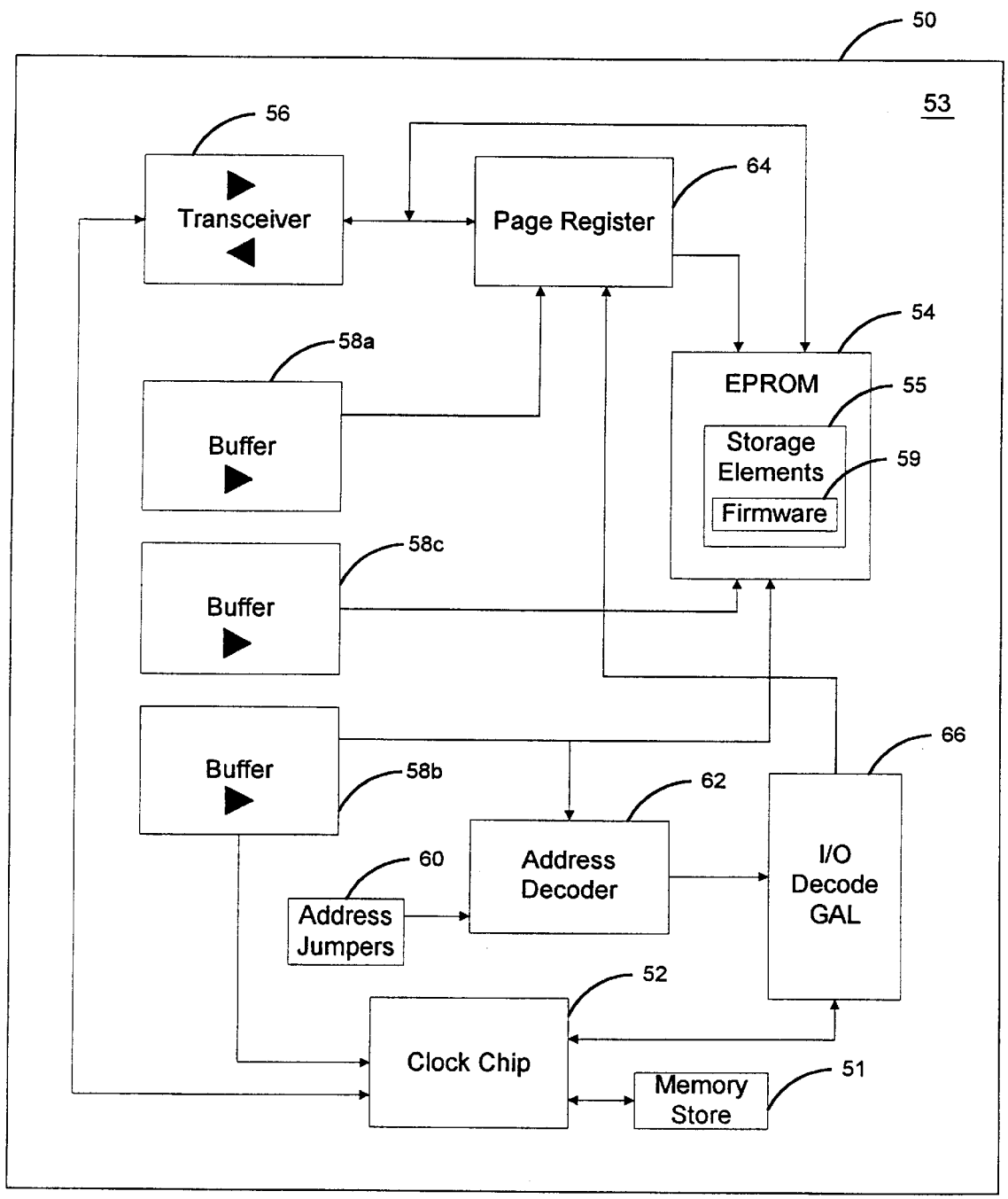
FIG. 4 is a simplified block diagram of the logic module of FIG. 3.

Now referring to the method steps of FIGS. 5–9 and the components shown in FIGS. 3 and 4, the logic module or card 50 cooperates with the PC 10 of FIGS. 1 and 3 to maintain a separate and totally isolated clock/calendar chip 52 that cannot be deliberately or accidentally altered by BIOS firmware during the boot process. Logic, which in a preferred embodiment is firmware 59 stored in an EPROM chip 54 on the card 50 correctly handles the rollover and subsequent 21st Century dates for its auxiliary clock chip 52. The correct dates are then extracted from the auxiliary clock chip 52 and used to correct the settings of both the DOS system clock 34 and the CMOS real-time clock chip 40 at the appropriate moment during the start-up process.

In a preferred embodiment, the auxiliary clock chip 52 is a totally self-contained encapsulated module complete with 10-year lithium battery, quartz crystal oscillator and integrated clock and calendar circuitry and preferably includes greater than 100 bytes of non-dedicated nonvolatile CMOS RAM storage. Due to its own CMOS circuitry, the auxiliary clock chip 52 continues to maintain the correct time and date regardless of power status on the PC 10.

Hardware Overview

Logic module 50 is preferably implemented as a PC add-in card coupled to expansion bus or slot 31 which communicates with bus 35 on motherboard 27 of PC 10. In a preferred embodiment, the card 50 is a standard PC-XT height half-sized add-in card that is PC and ISA bus-compatible. In a preferred embodiment, the card includes integrated circuit chips (52–66), pull-up resistors and capacitors (not shown), a two-layer surface-mount circuit board 53, an address jumper switch 60 for address selection shunts, alternate input/output (I/O) address (described herein) and a board disable feature (described herein) and miscellaneous mounting hardware (bracket, screws, etc., not shown).

In a preferred embodiment, the card utilizes any 8-bit (or greater) slot, such as slot 31, in communication with a standard PC Industry Standard Architecture (ISA) bus, such as bus 35. Preferably, the card is configured to not generate any hardware interrupts. Nor does the card 50, in a preferred embodiment, depend on hardware interrupts generated by other components of the PC 10.

An advantage of the preferred embodiment is that card 50 requires no external connections via cables, etc. All necessary signals are present on the PC bus 35. Logically speaking, the address space for the logic module or card 50 is 8K bytes of address space in PC-dedicated upper memory (between 640K and 1 MB of RAM 28), in an area dedicated for Option ROMs of add-in cards, such as the EPROM 54 of card 50. Thus, the design of card 50 takes advantage of the open architecture of PC 10 which provides for Option ROMs which generally are the location of stored code that acts as the controlling intelligence of such a card. Such code in combination with the ROM hardware is generally referred to as firmware. It is well-known that every Option ROM for an add-in card for a PC must include a precise pattern, or signature, that guarantees its recognition during the ROM-scan phase of the POST. Generally, if an Option ROM is recognized, the CPU 20 begins executing code stored in the ROM, or EPROM 54, in the present invention.

In a preferred embodiment, the logic card 50 uses either a 128K or 256K-byte EPROM 54 to store its firmware which is the code that executes the steps of the method of this invention. EPROM 54 may also be masked ROM, for the sake of enhancing security since EPROM may be accidentally or maliciously overwritten by someone with access to the correct tools. In order to prevent overburdening a large part of the limited ROM expansion address space in the PC, logic module 50 includes a paging method in order to expose only 8K bytes of EPROM 54's address space to the CPU 20. A paging mechanism provided as part of this invention provides access to the remaining information stored in the EPROM, in 8K increments or "pages."

Hardware Components

In a preferred embodiment, the card 50 includes clock circuit chip 52, EPROM 54, octal bus transceiver 56, octal buffer/drivers 58a–c, starting address selection jumpers 60, address decoder 62, page register 64, and a Generic Array Logic (GAL) Circuit chip 66 used as an Input/Output (I/O) decoder. A Programmable Array Logic (PAL) chip could be substituted for The Generic Array Logic chip. The EPROM 54 contains a storage element 55 for storing information. A memory store 51 in communication with clock 52 enables certain functions of the firmware. It will be apparent to those skilled in the art that the memory store may be internal to the clock or external. Also the clock 52 may be external to the module.

The octal bus transceiver 56 performs several functions. First, it provides a high-impedance load to the PC bus 35, for minimizing any effect from logic loading. Second, it allows signals to pass in either direction under logic control from the firmware of this invention.

A plurality of octal buffer/drivers 58 provide high-impedance loads to the bus 35 to reduce the risk of bus overload due to the additional load of the circuitry of the card 50. It will be appreciated by those skilled in the art that such buffer/drivers are optional, but are a preferred choice for sound engineering practice when implementing the preferred embodiment of the present invention. In particular older PCs from smaller manufacturers might benefit from such a safety measure.

In general, with regard to standard PC architecture, every add-in card with an option ROM must have a starting address in the range of A0000 through F8000 hexadecimal. Because of other fixed locations for such items as video adapter cards and the BIOS itself, the useful range of available addresses is restricted generally to C0000 through F4000 hexadecimal. This area must be shared with other devices such as controllers for every conceivable device (instrumentation, etc.) that might be connected to a PC. In critical recognition of this, the inventors have provided starting address selection jumpers 60 to enable the logic module's starting address to be adjusted to a value that is not in conflict with any other devices installed in the PC. Then in conjunction with software provided on disk, and described below as the pre-installation utility software the firmware in accordance with the method of this invention described with reference to FIGS. 5 through 9, determines an available starting address that can co-exist with other option ROMs.

The address decoder 62 compares the high-order seven bits (A19–A13) of every address that appears on the bus 35 with the preset address determined by the starting address selection jumpers 60. The jumpers only specify values for A17–A13 because A19 and A18 will always yield logic value "1" for the address range of C0000 through FFFFF hexadecimal. Whenever the address on the bus equals the starting address determined by the jumpers the address decoder issues a "ROMSEL"(ROM SELect low true) signal to activate the EPROM 54. The remainder of the address on the bus (A12–A0) then addresses the specific byte within a previously selected 8K window of the EPROM. The "ROMSEL" signal is detected by the GAL I/O decoder 66 which gates the octal bus transceiver 56 to pass a byte from the EPROM 54 onto the PC bus during the "MEMR" (MEMory Read low true) cycle.

The page register 64 stores a 5-bit value (0–31) which represents the five high-order bits of an 18-bit EPROM address. Logically, the 256K-byte EPROM 54 may be conceptually divided into 32 separate pages each 8K bytes in size. The page register 64 acts as a latch and "remembers" the page number until either a new value is stored in the register or the computer is rebooted with a cold boot. To store a new value in the page register 64, an I/O write instruction is performed by the firmware of this invention by sending a byte to a unique I/O port address number that is part of card 50. Such an alternate I/O address is provided for those instances where the primary address conflicts with other add-in devices previously installed in the machine. Only the low-order 5 bits of the data byte are of concern because the EPROM has only 32 pages (i.e, $2^5$=32).

The EPROM or Masked ROM 54 stores the firmware used by the logic module of card 50 to perform its various functions of compensating for an inadequate BIOS. Such functions may include century date correction, boot-time diagnostics, and network remote command capability. The example described of compensating for an improper date is just one example of the capability provided by the present invention for correcting low-level hardware problems on a PC. The size of the storage memory on the EPROM 54 is preferably either 128 K or 256 K. The EPROM is useful during testing of such a card built in accordance with the teachings of the invention but a Masked ROM is best for long term use because it can't be erased.

Eighteen address lines (A17–A0) may be used to access any byte of the EPROM or Masked ROM's storage capacity. In accordance with the method of this invention, a paging process is implemented by the hardware of this invention, whereby the five high-order bits of the address are established from the page register and 13 low-order bits are established from the addresses bus. Thus, the seven high-order bits establish the starting address of the EPROM in upper memory of PC RAM.

In a preferred embodiment of logic module or card 50, the GAL I/O decoder 66 is used to decode I/O addresses for the clock chip 52 and the page register 64. IOR and IOW bus signals are part of standard PC architecture and are used to distinguish I/O activity from memory access. This is necessary since both activities share the same address and data lines on the PC bus 35. As part of the preferred design of the card, certain I/O addresses and alternate I/O addresses (port numbers) are assigned to the clock chip 52 and the page register 64. Mathematical equations programmed into the GAL 66 perform the equivalence of address decoding by discrete logic chips. The use of a GAL reduces component expense and reduces the requirement to use space on the card. In a preferred embodiment, it is best to provide one input circuit of the GAL for monitoring a logic state of the alternate I/O address selection for the clock chip 52. This feature allows the clock's I/O port address and the page register's I/O port address to be assigned to an alternate value should there be a conflict with the primary address in a PC to which card 50 is combined for practicing the method of this invention.

Preferably, the GAL is also programmed to monitor other logic control signals on the bus so that it can perform a steering logic function and control the direction of data flow through the octal bus transceiver 56.

Another advantage of using a GAL is to provide a level of protection from board piracy because a security fuse can be blown in the GAL once the proprietary logic equations have been loaded. This prevents a rogue from doing a simple read-out of the GAL to determine the equations. With the security fuse blown the only way to determine the equations loaded in the GAL is to try hundreds of thousands of combinations of input stimuli while monitoring the output with a logic analyzer. This information would then be used to reverse engineer the functions provided by the embedded logic equations. While not an impossible task, such an effort would definitely discourage the casual counterfeiter.

Preferably, clock chip 52 is of the type manufactured by "Dallas Semiconductor" and is a totally self-contained and self-powered encapsulated module. Such a chip preferably includes an imbedded lithium battery to power the clock's oscillator and provide CMOS RAM data retention for about 10 years. Advantageously, the logic module or card 50 is thus capable of maintaining the correct date and time in order to be immune to any discrepancies caused by faulty BIOS code on the motherboard 27 of PC 10.

Optionally, installation of a board disable jumper may be used to electrically disable operation of card 50. Such a feature allows for diagnostics and trouble shooting without the necessity of physically removing card 50 from communication with the bus 35. It also simplifies installation of the card in PC 10 so that the PC can perform its normal boot process without influence from operation of the card until it has been properly initialized using the post-installation utility software described below. Alternatively, the module may be shipped disabled and require an enable jumper to prevent the card from being by-passed during the initial boot. It will be apparent to those skilled in the art that either would work for the purposes described above.

Logic Implemented as Firmware

Referring to FIGS. 5–9, logic of the invention, preferably implemented as firmware in the EPROM or Masked ROM 54 performs the method steps described now. In step 100 (FIG. 5), the logic module on card 50 gains control of bus 35 during POST by being recognized as an Option ROM, in accordance with standard PC operation. To be recognized by the BIOS and gain control, the code in the card's EPROM (at address Page 0) exhibits the following characteristics shown in Table 1, as defined by IBM's open architecture model:

Table 1

● The EPROM must begin on a 2KB (800 hexadecimal) boundary (in our case an 8KB [2000 hexadecimal] boundary).

● The boundary must be in the range of C8000 hexadecimal through DF800 hexadecimal.

● The first byte of the block must be 55 hexadecimal.

● The second byte of the block must be AA hexadecimal.

● The third byte of the block must be an unsigned number from 00 hexadecimal to FB hexadecimal, which when multiplied by 512, specifies the EPROM size in bytes (in the preferred embodiment 10 hexadecimal signifies 8K bytes).

● The EPROM must check sum to zero (modulo 100 hexadecimal) over the range specified by the third byte, above.

● The fourth and fifth bytes (and possibly the sixth) must be a jump to the entry point of the firmware within the EPROM (or Masked ROM).

● The firmware must execute an RETF (far return) when done to relinquish control back to POST.

Self-Test of Clock

Figure 5:
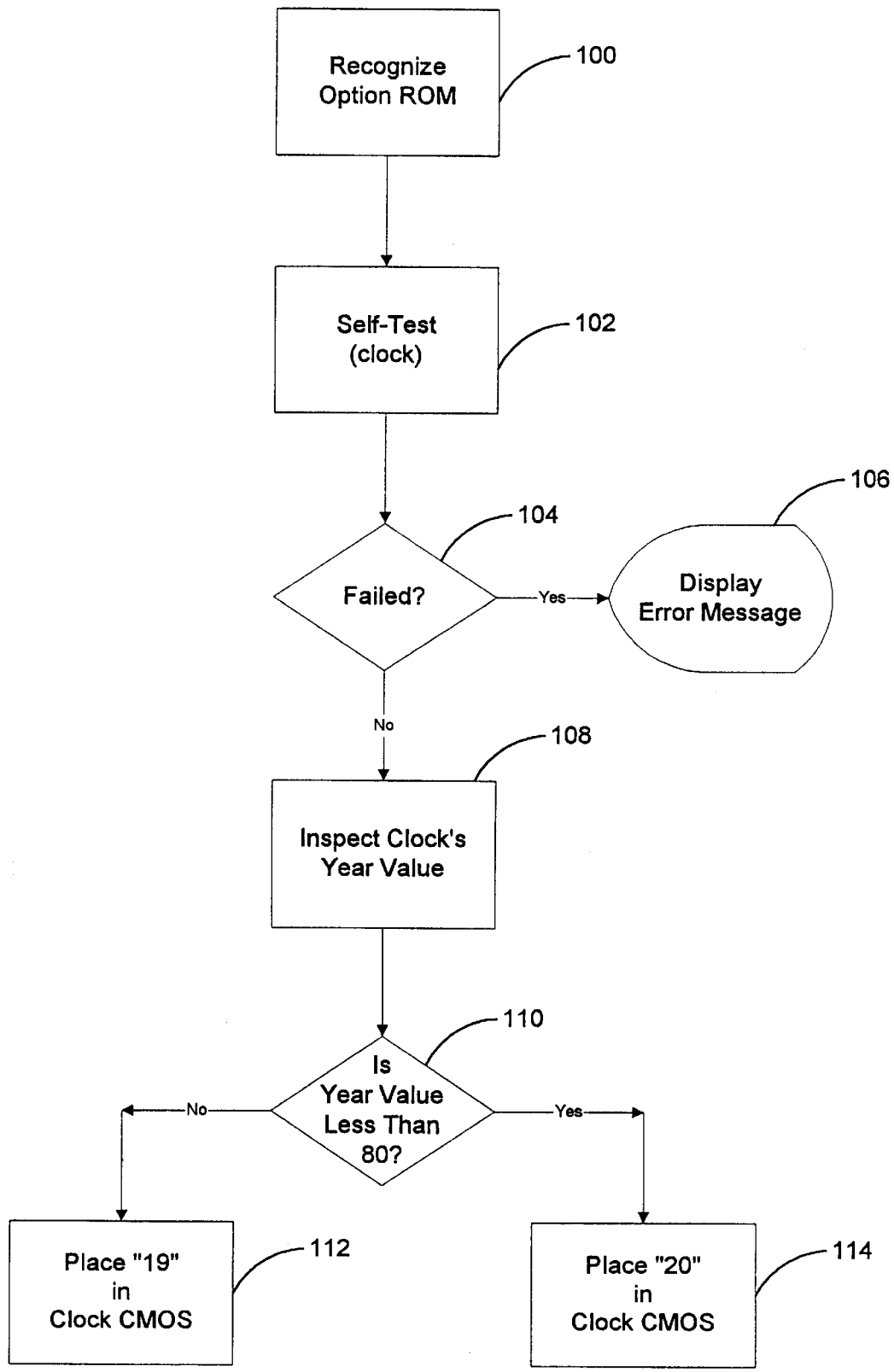
FIGS. 5, 6, 7, 8, and 9, each show flow diagrams illustrating an overview of steps, carried out by the firmware in combination with other components of the logic module of FIGS. 3 and 4.

Referring to FIG. 5, in step 102, the logic of the firmware performs a self-test, the firmware determines the status of the clock chip 52 by reading its status bits and by determining if the chip is keeping proper time. If, according to the interrogatory of step 104, the chip 52 fails the self-test, an error is displayed in step 106 on a display (not shown) attached to the PC 10. The firmware returns control to the BIOS 24 without performing any other functions. If, on the other hand, the clock self-test is successful, in step 108, a year value in the clock chip 52 is inspected. The internal architecture of the preferred Dallas semi-conductor clock chip is well-known, including such value. Another interrogatory step 110 is determined based on the year value stored in the memory store 51. Accordingly, in step 114, if the value is less than 80 a "20" value is forced into the CMOS storage location of the clock chip 52 at offset 32 hexadecimal. Otherwise, the value of "19" is forced into this CMOS location of the clock chip 52 (step 112). This simple technique ensures that the preferred clock chip rolls over to the 21st Century and guarantees valid dates from Jan. 1, 1980 (the base line of most PC BIOS) through Dec. 31, 2079.

Diagnostics

Figure 6:
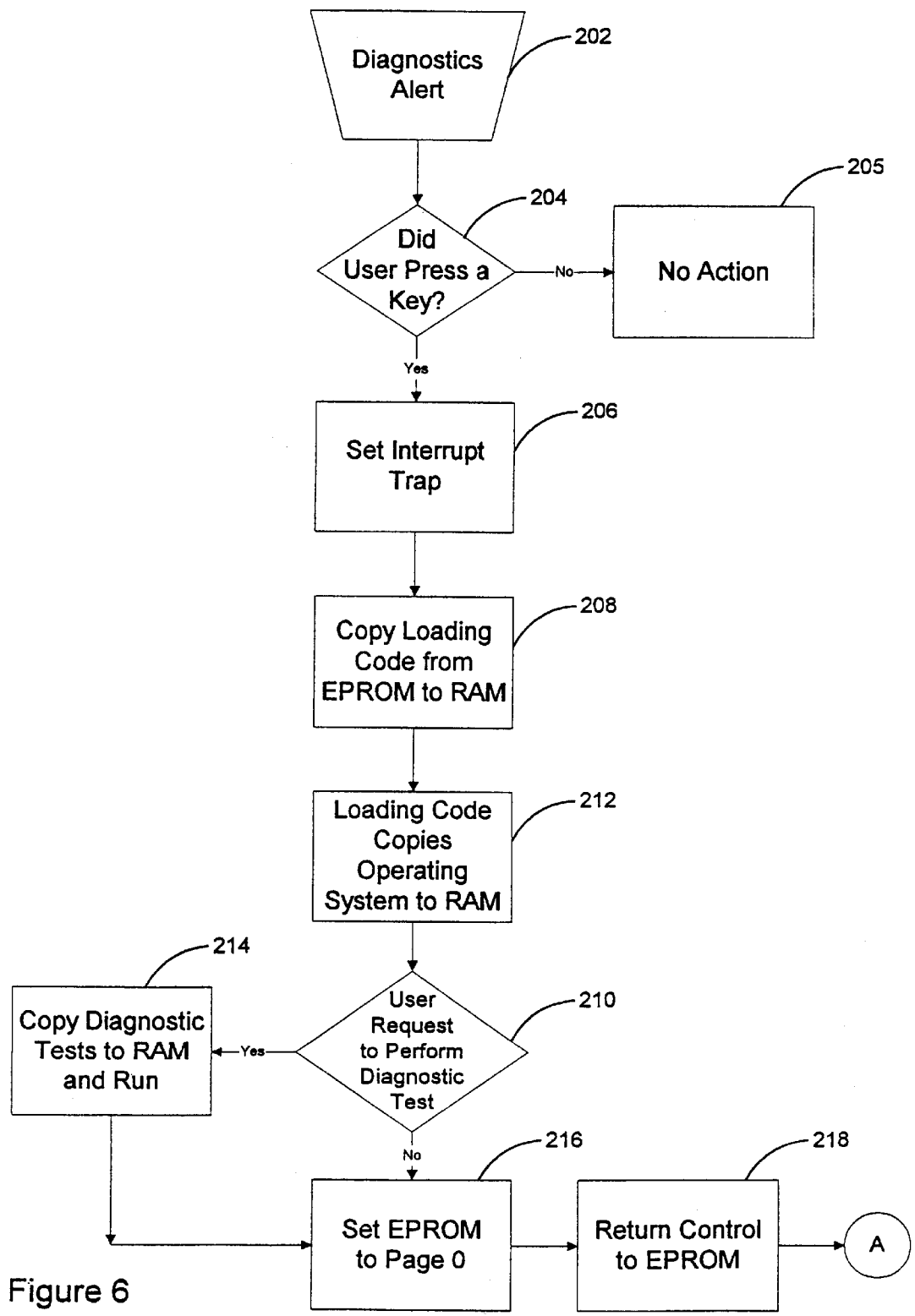

Referring to FIG. 6, in step 202, following the clock self-test described above, the logic of the firmware causes a message to be displayed alerting a computer user of diagnostic capabilities provided in the EPROM 54 of this invention. For example, a message such as "Press a key within three seconds to perform diagnostics" may be displayed. In step 204, an interrogatory is performed to determine if the user has pressed a key. In step 206, the firmware sets a trap to intercept interrupt 15 in case the user types "CTRL/ALT/DEL" during this time period, in order to prevent a warm boot. A warm boot is a boot sequence initiated by typing the above-referenced key sequence. In such a case, no hardware reset occurs and the BIOS routine skips main memory testing. Then, most other functions of POST are performed as in a normal cold boot. A cold boot is the sequence initiated when power is applied or reset on PC 10. The reason a warm boot is prevented is caution to prevent a BIOS error during the ROM scan. Since the proper code is loaded at page 0, including the signature portion that is recognized during the ROM scan, any other location other than page 0 would cause a BIOS error during the ROM scan portion of such a warm boot.

The above-described method is one way of handling a warm boot enabled by this invention. Other ways are described below.

Next in step 208, the firmware copies certain code from page 0 of the EPROM 54 into low RAM 28 of the PC 10 and passes control to it. This code which performs a loading function must reside in RAM 28 before it can execute since it accesses program code and data from other pages of the EPROM 54. It is not possible to execute code from one page of the EPROM using operands or data residing in a different page.

Next in step 212, the loader code then copies other code from EPROM 54 to RAM 28. Control is then passed to RAM for execution of the code that was passed by the loader code. This passed code acts as a diagnostic operating system that performs diagnostics. A user may then request to perform diagnostic functions and in response to such a user request, various sections of diagnostic code are copied from EPROM 54 to RAM 28 in step 214. It may be preferable to compress such data and then uncompress it when it is copied into RAM. Nevertheless, such a choice will depend upon many factors including the size of the EPROM chip and the amount of diagnostic code. If the user chooses to run any of the diagnostic tests, results of such tests may be displayed for the user on a CRT screen (not shown) attached to PC 10. At the completion of the test, the code acting as the diagnostic operating system in RAM 28 restores the EPROM to address page 0. Control is then returned to the EPROM 54 in step 218.

Figure 7:
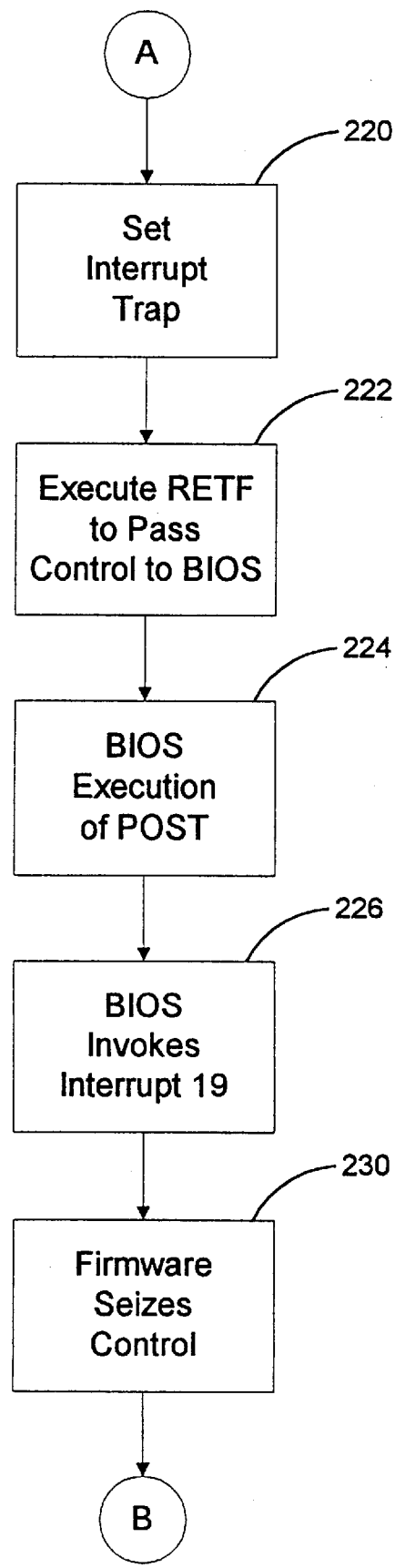

Referring to FIG. 7, in step 220, the firmware sets another trap. Then in step 222, the firmware executes a "RETF" (far return command) instruction to pass control back to BIOS 24. In step 224, the BIOS code completes its normal power on self-test (POST) and any other normal housekeeping chores required for relinquishing control to CPU 20. Once all these normal operations are completed and the post is complete, the BIOS is now ready for an operating system to be loaded into RAM 28 and for the CPU 20 to take control of PC 10. This in accordance with normal PC operation, the BIOS invokes interrupt 19 to perform this task in step 226. Recall however, in accordance with the method of the present invention, the firmware had set a trap at interrupt 19 in step 220 and therefore the firmware "seizes" control of PC 10 and delays the boot process in step 230. Once this seizing action has taken place, no additional BIOS POST code is executed, following this step 230. However, any damage to the date stored in the real-time clock 40, due to BIOS code deficiencies can then be repaired by the firmware of this invention.

Figure 8:
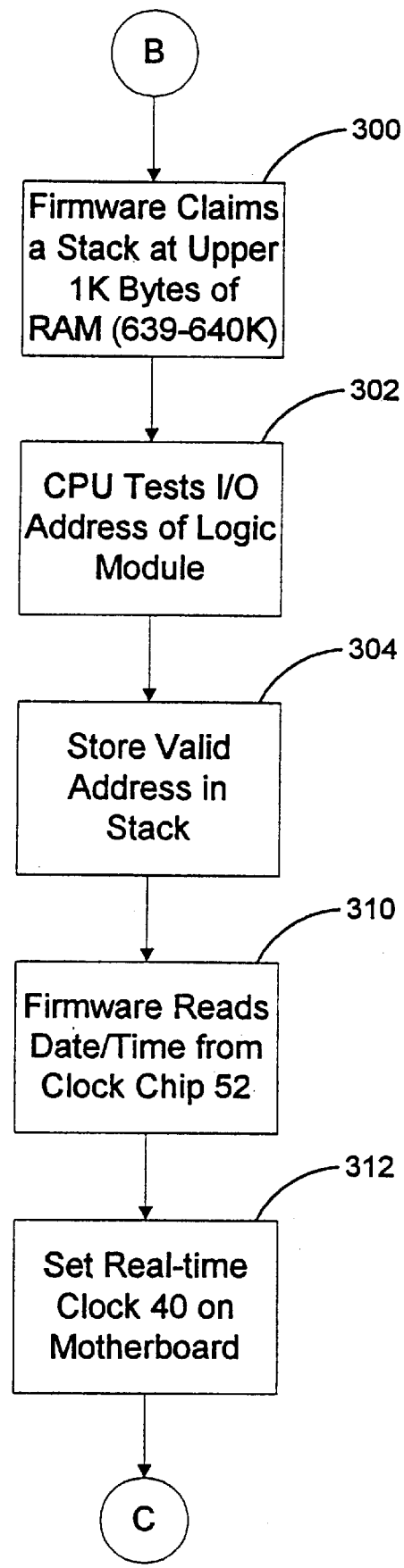

Referring to FIG. 8, in step 300, the firmware claims the 1K bytes of RAM in lower memory (639–640K or the upper 1K of whatever size is present) by adjusting a value stored in the system table of RAM 28. This storage space is used by the firmware to store dynamically-generated constants and to provide programming stack space for firmware being executed from EPROM 54. Next in step 302, the I/O port address the card 50 and its alternate address is determined by commanding CPU 20 to test addresses and determining which one of the two is being used. The valid address is then stored in the stack space allocated in step 300 in the storing step 304. Next, in step 310, the firmware, which is still in control of the computer, reads the correct date and time information from the clock chip 52 and then sets the PC's motherboard clock 40 using standard BIOS interrupt 1A hexadecimal. This action includes setting the correct century (i.e., a "19" or a "20") in location 32 hexadecimal. This is a significant action because it overcomes BIOS deficiencies that may have eradicated a potentially correct date in clock 40 on PC motherboard 47.

Figure 9:
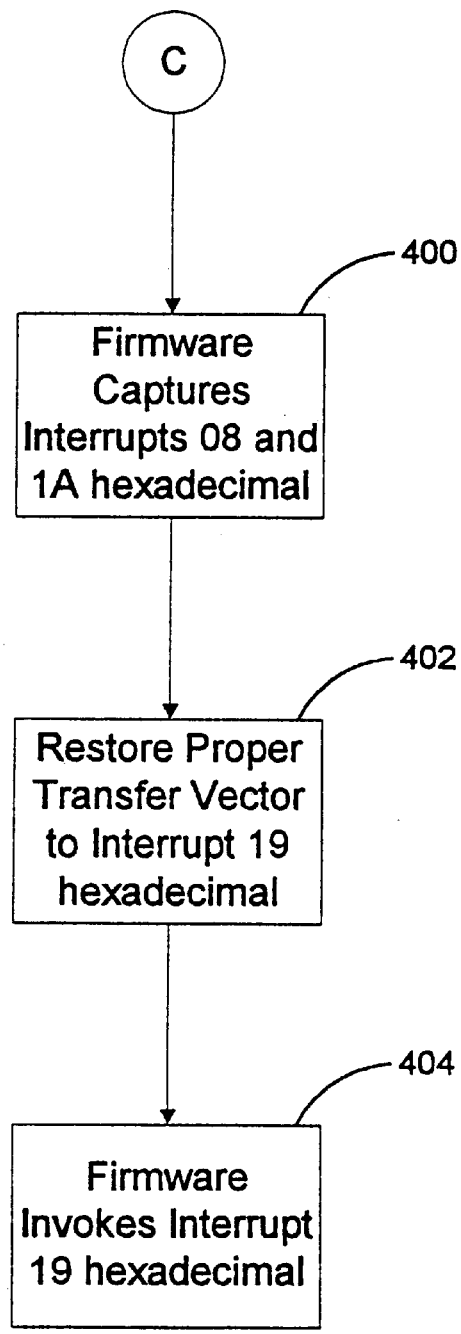

Referring to FIG. 9, in step 400, following execution of step 310, the EPROM firmware places intercepts to capture interrupts 08 and 1A hexadecimal. These are standard BIOS code interrupts that service the real-time clock 40. Interceptions are necessary so that the roles of these interrupts can be expanded to include updating the clock chip 52 on card 50 in response to user initiated commands, such as the well-known DOS date and time commands. Therefore setting the date and time of the clock chip 52 is transparent to the user and this another advantage of this invention. Following execution of step 400, the EPROM firmware has performed all of the actions in housekeeping needed to overcome a faulty or deficient BIOS and now guarantees that the computer has the correct date and time. It should be apparent to those skilled in the art that the firmware and the circuitry of this invention are useful for overcoming any problems with low-level hardware including BIOS of a PC. This example of fixing a date and time problem due to deficiencies in BIOS is merely one example of the utility of this invention. In step 402, the EPROM firmware restores the proper transfer vector to interrupt 19 hexadecimal, making it possible to complete a boot sequence of PC 10.

Next in step 404, the EPROM firmware invokes interrupt 19 hexadecimal in exactly the same way that BIOS executing a POST operation would have, had it not been for the firmware intercept function which takes only a few milliseconds. The interrupt 19 BIOS code now starts the actual process of loading an operating system 22 into the RAM 28 of PC 10 in accordance with normal PC operation.

The firmware of this invention provides other advantages enabled by capturing interrupts 08 and 1A hexadecimal. Interrupt 08 hexadecimal acts as a conduit to forward (or extract) date and information to the real-time clock 40. Actual values are placed in designated registers and the interrupt service code handles the details. In this manner, the PC operating system 22 is shielded by the firmware from having to know any hardware specifics of the logic module 50. By utilizing this particular interrupt, the clock chip 52 is accessed transparently. Using this interrupt service code guarantees that the clock chip 52 always receives new date and time information at the same time as the real-time clock does. However, when an interrupt 08 hexadecimal subfunction is invoked to read the real-time clock 40, the clock chip 40 is not included in that process because the value of the clock chip occurs prior to the boot sequence, not after.

The firmware also utilizes interrupt 1A hexadecimal, which is invoked approximately 18.2 times per second, in response to hardware interrupts from an oscillator (not shown) on the motherboard 27. It is the accumulation of these pulses that provide the basis for the operating system to determine the time of day, rather than the actual hours, minutes and seconds being generated by the real-time clock 40. By utilizing this interrupt, the EPROM firmware can monitor handling such things as configuring the PC 10 for correct handling of leap day, February 29, in the year 2000. The firmware includes information about which years should be included as a leap year. In particular, the inventors have recognized that the year 2000 is a leap year, according to a little-known 400-year rule that must be applied to override a conventional 100-year rule which is applied to override a conventional 4-year rule.

Paging Mechanism and Technique to Enable Execution when Another Page is Accessed Physically, an EPROM, such as EPROM 54 consists of a fixed number of bytes, such as 256K bytes. The inventors have divided this storage space into 32 logical pages of 8K bytes each. Because of this, and because of the circuitry shown in FIG. 4, a single 8K-page is exposed for access by the CPU at any point in time. The pages are numbered 0 through 31 and a page is selected when the CPU executes an I/O instruction to the a page register I/O address and sends it a numeric value in the range of 0 to 31.

This method of changing pages and accessing the EPROM works in prior art configurations provided the CPU is executing code from either RAM 28 or some other ROM module, such as ROM 30. However, the inventors have discovered a technique for enabling a PC's CPU to execute code directly from one of the EPROM logical pages and then immediately access another page of the EPROM 54. If the firmware executes an I/O instruction to the page register 64 to change the page, the very next instruction executed by the CPU 20 will be on the newly selected page, and at an address that is offset one instruction beyond the I/O instruction's offset in the original page. In prior art configurations, without the inventor's solution, such a switching mechanism would not work because the CPU's instruction counter (the point where it is currently executing code) advances into the middle of code (or data) on the selected page.

By combining the firmware 59 and the logic module 50 of this invention, the inventors have created (1) a paging mechanism that only takes up a small portion (e.g., 8K) of the 384K upper memory area of ROM expansion address space in the PC, even though the EPROM and the executable code stored thereon are quite large (e.g., 256K); and (2) a technique for enabling code to be directly executed from an EPROM even when it is necessary to access another page. These are each described in more detail below.

By using I/O instructions in conjunction with decoding equations of the I/O Decoder GAL 66 to alter the contents of page register 64 coupled with an addressing scheme, the inventors have devised a method to utilize memory, such as EPROM 54, with executable code stored thereon while exposing only a small portion (2K, 4K, 8K, etc.) logically to the upper ROM expansion address space of the PC 10.

The inventors have recognized that the EPROM firmware must be executable across page boundaries. For example, it is required to do so, in order to satisfy conditions of a possible warm boot that may occur. A warm boot initiates a ROM Scan without resetting the page register back to page 0. Only a cold boot resets the page register. Therefore, every page of the EPROM must be recognizable during the ROM Scan of the PC's Power on Self Test (POST) in order to be accepted as a valid option ROM. Thus, if the computer operator were to cause a warm boot (either accidentally or deliberately) while code was being executed from any page except page 0 of the EPROM, the EPROM would then fail to be recognized as an option ROM and the BIOS (called via the POST routines) would either ignore the EPROM or report a memory failure.

This problem is solved by making every logical page of the EPROM appear to be an option ROM, by creating a so-called "ROM Scan recognition code", that appears at the beginning of each page's data structure. This means that the first two bytes must be "55AA" hexadecimal and the third byte must be a binary number that is equal to the size of the page in bytes divided by 512. The next two or three bytes must be a jump to the start of executable code. And, the entire page must checksum to zero modulo 100 hexadecimal, as described above. Thus, no matter what state the page register is left in at the time of a warm boot that page of the EPROM will be recognized as an option ROM and will gain control of the CPU. In order to do this the code stored on each page in the EPROM must be broken into segments slightly smaller than 8K in order to allow co-occupation of each page of the EPROM along with each page's ROM Scan recognition code.

Nevertheless, the ROM Scan recognition code does not solve all problems that may be encountered when attempting to load code remotely from an option ROM to fix deficiencies in the low-level hardware, or base system of a PC. The following scenario describes an exemplary problem. When a warm boot occurs while the page register is set to any value other than true page 0 (for example, true page 7) then control passes to the wrong part of the firmware for executing in synchronization with the POST operation, which must occur for correct execution of a warm boot. But the proper code for the required synchronization with the BIOS POST is on true page 0 of the EPROM. Thus, the inventors have recognized there are really two problems to be solved, one problem is solved by the ROM Scan recognition code, but the warm boot problem described in this paragraph must also be addressed and solved.

The warm boot problem is solved as follows. On every page of the EPROM, except page 0, the entry point code located at the fourth byte develops the I/O address of the page register and then issues an I/O instruction to switch page register 64 back to page 0. Thus, the next instruction executed by the CPU will be offset one byte beyond the I/O instruction, except that will be executing code from page 0, rather than the current page, such as page 7 (from the above-example). Therefore, at the location of page 0, a redundant, but vital, jump to the start of real code (i.e, page 0) is required.

In order to execute code across page boundaries, multiple jumps must be accommodated. Thus, to allow any page to jump to any entry point of any other page "on-the-fly" or while executing, requires the use of page 0 as an intermediary. Every page other than 0 sets a value in a register and then jumps to a common location to issue the I/O instruction to the page register. Page 0 is set up to execute the next instruction after this common location. It takes the value placed in the register and uses it as an offset into a vector of jumps, wherein each jump leads to an entry point within that page. The absolute value of a negative number in the register provides the offset into a different jump vector when another page requires return of control to page 0.

The inventor's solution while described above in terms of solving a system problem, such as a BIOS deficiency leading to an error in the operating system's system clock, is not limited to such a process. The paging mechanism that takes up only a small portion of ROM expansion with the, even though the EPROM and the executable code stored thereon are quite large (e.g., 256K); and (2) a technique for enabling code to be directly executed from an EPROM even when it has access to another page will be recognized by those skilled in the art as being useful for problems such as remote diagnostics. For example, code could be executed directly from the EPROM to diagnose and fix deficiencies on a machine with faulty RAM. Also for example, a JAVA engine, or Basic-language interpreter, could be executed directly from the EPROM in view of the teachings above.

Figure 10:
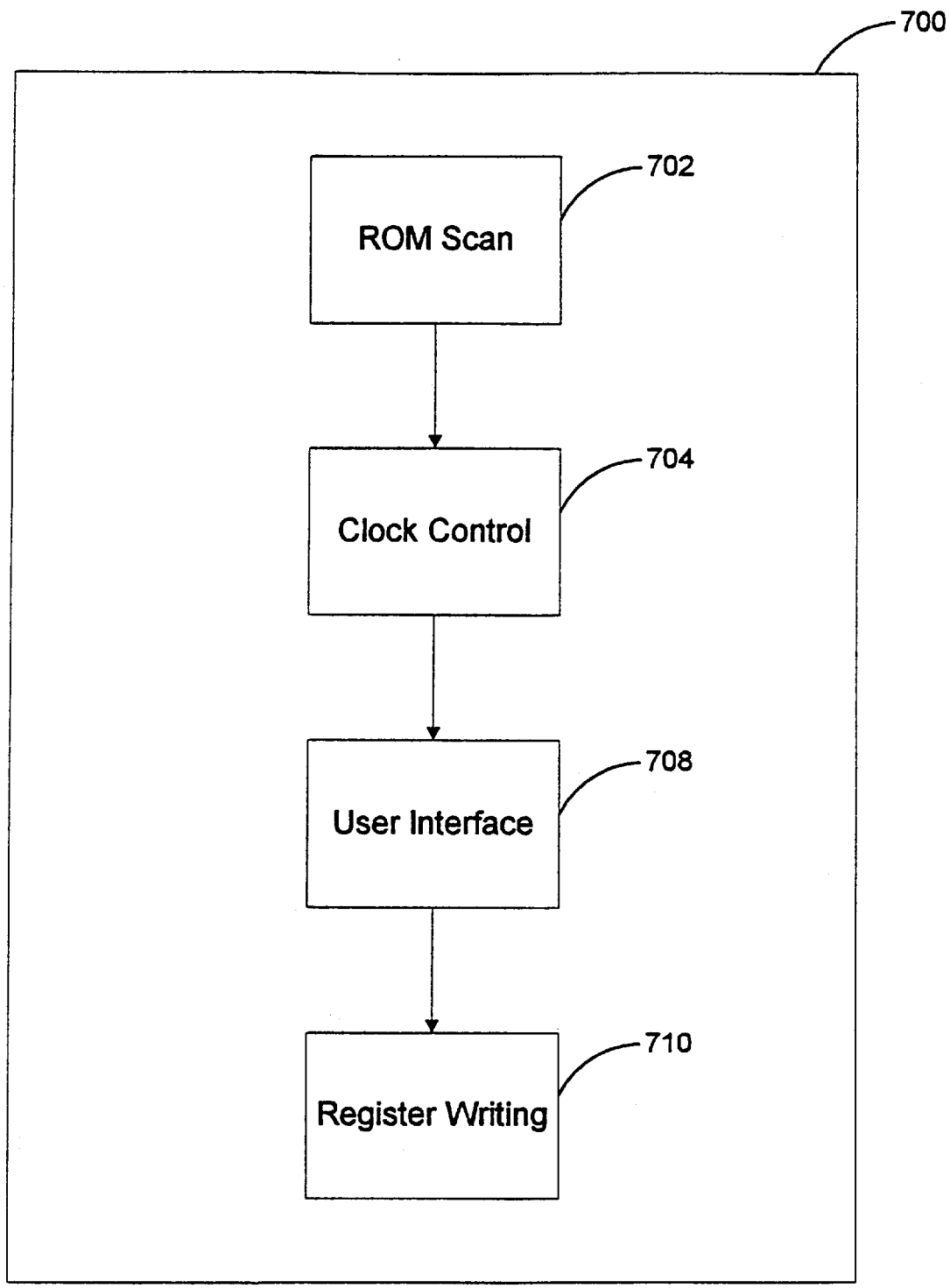
FIG. 10 is an overview of the submodules, comprising a software module that is useful for configuring logic module 50 to work in a cooperative relationship with the PC of FIGS. 1 and 3.

Software for Installation and Utility included with the Hardware and Firmware of this Invention Referring to FIG. 10, software module 700 is a post-installation software utility that is enabled to perform several functions by code modules that are included as part of the software module. First a ROM scan module 702 verifies that the card 50 is installed and functioning. The software module 700 may be written in any language suitable for communicating with a PC, such as C++. The software module 700 must also include submodule 704, which is a clock control module. Once the card 50 is verified as installed, the program 700 uses clock control module 704 to turn on the oscillator in the clock chip, 52 which is a preferred Dallas semiconductor chip. A user interface module prompts the user to type in the date or time he wishes to manually set. Submodule 704 then sets clock chip 52 and writes the date and time into a CMOS register on-board logic module or card 50. The register writing submodule 710 then records a distinctive 2 or 3-byte pattern in a register of the CMOS memory to identify which address port number identifies card 50 to PC 10. The user interface submodule 708 prompts the computer operator to reboot the computer and terminate this operation. A boot is required so that the now initialized card 50 can set the system clock 34 and establish the interrupt vector intercept it needs in order to function fully. Nevertheless, the inventors recognize that it may be preferable to install the card with a disable jumper in place so that the card is by-passed during an initial boot. Then the inventors recommend removing such a disabled jumper, running the software module 700 or a post-installation utility to turn on the oscillator of the battery of clock chip 52 as described above. Once the battery is turned on and the other housekeeping and accounting functions, as described above are performed, the computer can then be rebooted and the card becomes fully functional. It can be recognized by one skilled in the art that module 700 represents a combination of computer logic and may be hardware or software and may simply represent a recording medium such as a well-known floppy disk. Of course, as described above, the card may be shipped without a required enable jumper to achieve the same purpose in a slightly different way.

Other embodiments and configurations may occur to those skilled in the art in view of these teachings. For example, the logic module may be implemented completely as hardware or software, rather than in the preferred embodiment of firmware. Therefore, the spirit and scope of this invention is not to be limited by anything other than the appended claims and their equivalents.

What is claimed is:

1. A logic module for operating in combination with a PC having a motherboard and main-memory in communication with the motherboard, the logic module being for correcting errors caused by deficiencies existing in logic residing on the PC's motherboard, the motherboard including a BIOS and a real-time clock circuit, the main-memory including an operating system loaded therein and a system clock used by the operating system to determine the time and date for the PC, the logic module comprising:

a transceiver module;

a memory module coupled with the transceiver module and containing non-volatile storage elements and executable code stored as pages, each page of the pages being of a predetermined number of bytes of code in the storage elements;

a page register module in communication with the transceiver and the memory modules;

a paging mechanism that cooperates with the page register module and the transceiver module for allowing only a predetermined number of bytes of executable code to be accessible for operation in the PC's main-memory in order to correct errors caused by deficiencies existing in logic residing on the PC's motherboard;

a clock module in communication with the transceiver module and the memory module, the clock module in communication with a memory-store;

the executable code in the memory module further including:

a clock-reading mechanism responsive to information contained within the clock module's memory store by placing a century designating value within the clock's store;

an interrupt-trap setting mechanism capable of seizing control from the PC's BIOS in response to a predetermined interrupt for which an interrupt-trap is set by the interrupt-trap setting mechanism; and a clock-setting mechanism responsive to date and time information read by the clock-reading mechanism for setting the real-time clock on the motherboard that is incorrect due to deficiencies in BIOS.

2. The logic module of claim 1, wherein a different page of executable code is accessible from the memory module while another previous page of executable code is being executed.

3. The logic module of claim 1, wherein the predetermined amount of bytes is selected to be in a range from 2K to 64K.

4. The logic module of claim 1, in combination with computer-executable instructions for configuring the logic module to operate in combination with the PC following coupling of the logic module in electrical communication with the PC's motherboard.

5. The logic module of claim 4, wherein the combination further includes computer-executable instructions recorded on a computer-readable medium.

6. The logic module of claim 5, wherein the computer-readable medium of the combination is a disk.

7. A logic module for operating in combination with a PC having a motherboard and main-memory in communication with the motherboard, wherein the PC motherboard includes a BIOS and a real-time clock circuit, and main-memory includes an operating system loaded into the memory and a system clock used by the operating system to determine the time and date for the PC, the logic module comprising:

a transceiver module;

a memory module in communication with the transceiver module and containing non-volatile storage elements and executable code;

a clock module in communication with the transceiver module and the memory module, the clock module in communication with a memory-store;

the executable code in the memory module further including code for performing a clock-setting operation, the code including:

a clock-reading mechanism responsive to information contained within the clock module's memory store by placing a century designating value within the clock's store;

an interrupt-trap setting mechanism capable of seizing control from the PC's BIOS in response to a predetermined interrupt for which an interrupt-trap is set by the interrupt-trap setting mechanism; and a clock-setting mechanism responsive to date and time information read by the clock-reading mechanism for setting the real-time clock on the motherboard in accordance with the century designating value within the clock's store.

8. The logic module of claim 7, wherein the executable code is stored as pages, each page of the pages being of a predetermined number of bytes of code in the storage elements, and the logic module further comprising:

a page register module in communication with the transceiver and the memory; and a paging mechanism that cooperates with the page register and the transceiver for allowing only a predetermined number of bytes of executable code to be accessible for operation in the PC's main-memory in order to carry out the clock-setting operation.

9. A system comprising:

a PC having a motherboard and main-memory in communication with the motherboard, wherein the PC motherboard includes a BIOS and a real-time clock circuit, and main-memory includes an operating system loaded into the memory and a system clock used by the operating system to determine the time and date for the PC;

a logic module including:

a transceiver module;

a memory module in communication with the transceiver module and containing non-volatile storage elements and executable code;

a clock module in communication with the transceiver module and the memory module, the clock module including a memory-store;

the executable code in the memory module further including code for performing a clock-setting operation, the code including:

a clock-reading mechanism responsive to information contained within the clock module's memory store by placing a century designating value within the clock's store;

an interrupt-trap setting mechanism capable of seizing control from the PC's BIOS in response to a predetermined interrupt for which an interrupt-trap is set by the interrupt-trap setting mechanism; and a clock-setting mechanism responsive to date and time information read by the clock-reading mechanism for setting the real-time clock on the motherboard in accordance with the century designating value within the clock's store.

* * * * *